United States Patent [19]

Fakla et al.

[11] 4,129,539

[45] Dec. 12, 1978

[54] HOT MELT ADHESIVES FOR CELLULOSIC MATERIAL

[75] Inventors: Istvan E. Fakla, Glashutten; Reinhard Grote, Oberursel, both of Fed. Rep. of Germany

[73] Assignee: USM Corporation, Farmington, Conn.

[21] Appl. No.: 829,160

[22] Filed: Aug. 30, 1977

[30] Foreign Application Priority Data

Aug. 31, 1976 [DE] Fed. Rep. of Germany ....... 2639132

[51] Int. Cl.² ............................................. C08L 31/00
[52] U.S. Cl. ................................................. 260/27 R
[58] Field of Search .................... 260/27 R, 27 EV; 106/218

[56] References Cited

U.S. PATENT DOCUMENTS

| 2,657,189 | 10/1953 | Pinkney | 260/27 R |
| 3,377,305 | 4/1968 | House | 260/27 R |
| 3,849,353 | 11/1974 | Taft et al. | 260/27 EV |
| 3,865,770 | 2/1975 | Blake | 260/27 R |

FOREIGN PATENT DOCUMENTS 708663  4/1965  Canada ............................... 260/27 EV

*Primary Examiner*—Theodore Morris
*Attorney, Agent, or Firm*—Benjamin C. Pollard; Richard B. Megley; Vincent A. White

[57] ABSTRACT

Adhesive composition for application in molten condition to cellulosic materials to form adhesive bond and also capable of being dissolved or dispersed in cold water includes a mixture of cold water-insoluble polymeric material having free carboxyl groups and sufficient aliphatic amino alcohol for reaction with those carboxyl groups to promote solubility of the polymeric material in cold water as in a repulping operation.

12 Claims, No Drawings

4,129,539

HOT MELT ADHESIVES FOR CELLULOSIC MATERIAL

FIELD OF THE INVENTION

The present invention is concerned with hot melt adhesives for cellulosic materials.

BACKGROUND OF THE INVENTION

In the adhesives art, there is a trend in various countries towards increased use of compositions which are essentially solvent free and non toxic. In particular, there is a tendency towards use of hot melt adhesives in the manufacture of paper reinforcing tapes, books, sanitary napkins and diapers. In order to be fully satisfactory as a paper adhesive, a hot melt adhesive must be capable of supply in a handleable form for convenient application as a hot melt, and in use must provide bonds of satisfactory strength, flexibility and heat resistance. Desirably also, the composition of the adhesive will be such that when paper materials bonded with the adhesive are subjected to a repulping operation in order to reclaim the paper, the composition will not adversely affect the repulping of the paper. Repulping of paper materials normally involves removal of insoluble materials, including metal clips and adhesives, and then mastication of the paper material in water followed by subsequent filtering of the slurry and drying of the raw paper on heated drum rollers. At present it is a practice to remove and reject adhesively bonded papers prior to repulping so as to ensure that the heated drum rollers are not contaminated. It is desirable therefore to provide an adhesive composition which is sufficiently soluble or dispersible under repulping conditions to permit removal of at least the adhesive components of the composition in the water to facilitate repulping of paper bonded with the composition without adversely affecting repulping. Similarly, it is desirable that bonds in cellulosic napkins and diapers will break down in copious quantities of water for ready disposal.

There is disclosed in U.S. Pat. No. 2,657,189 a hot melt adhesive composition for bookbinding comprising vinyl acetate-crotonic acid copolymer, which composition is dispersible in dilute aqueous alkali. An essential component of this adhesive is chlorinated diphenyl, which is regarded as undesirably toxic. The presence of free carboxylic groups of the copolymer capable of salt formation with a dilute alkali (such as sodium, potassium and ammonium hydroxides) and is said to promote dispersibility and solubility in water. However, in order to achieve successful dispersibility or solubility, one relies on the use in the paper repulping operation of a suitable quantity of the necessary dilute alkalies. It is therefore apparent that careful control of the alkalinity of the aqueous repulping medium is a critical requirement for proper dispersion of the adhesives disclosed in this patent. This careful control is not always possible, and is especially inappropriate in those cases where domestic waste is disposed of through domestic sewage systems as may be the case with diapers and napkins. In such cases it is important that the adhesive bond break down comparatively quickly on contact with quantities of town water.

BRIEF STATEMENT OF THE INVENTION

It is one object of the present invention to provide an adhesive composition from readily available non toxic raw materials which is capable of hot melt application to provide strong, flexible, heat resistant bonds to paper and cellulosic materials generally, and which is also such that the adhesive bond may be broken down by immersion in cold water.

It is another object of the present invention to provide an adhesive composition from readily available non toxic raw materials which is readily capable of hot melt application to provide strong, flexible, heat resistant bonds to paper and cellulosic materials generally, and which is also such that cellulosic materials bonded with it may be recovered using in the recovery process cold water which is not especially alkaline.

We have now found that an adhesive composition which may be applied as a hot melt to provide good adhesive bonds to cellulosic materials, and which can be rendered adhesively ineffective in copious quantities of water, for example in a repulping operation involving mastication with cold water of pH 6 to 9, may comprise polymeric binder material which is insoluble in cold water and which has free carboxyl groups, and sufficient aliphatic amino alcohol reactive in the presence of water with the carboxyl groups to promote solubility or dispersibility of the polymeric material in cold water.

DETAILED DESCRIPTION OF THE INVENTION

The adhesive composition of the present invention is a combination of a cold water insoluble thermoplastic polymeric binder material having free carboxyl groups together with an amino alcohol reactive with the carboxyl groups in the presence of water to promote solubility or dispersibility of the polymeric material in water. By insoluble polymeric material where used herein we mean polymeric material of which not more than 0.10 g. become dissolved when 0.15 g. of the polymeric material is dispersed in 100 cc. of water of pH 6 to 9 at 40° C. for a period of 2 to 5 minutes. Correspondingly, by soluble material where used herein we mean that more than 0.12 g. of the material become dissolved when 0.15 g. of the material is dispersed in 100 cc. of water, pH 6 to 9, at 40° C., for a period of 2 to 5 minutes.

In an adhesive composition according to the invention, the aliphatic amino alcohol serves to assist in solubilizing a potentially soluble component of the composition (i.e. the polymeric material), when mixed in water. The amino alcohol used is desirably one which also serves as a plasticizer for the adhesive composition and is selected in accordance with a number of criteria. It is believed that the amino alcohol reacts chemically with carboxylic acid groups present in the insoluble polymeric binder when immersed in cold water. Effectively then, the amino alcohol selected is one which remains present in the composition until such time as the repulping or disposal process is carried out, and this imposes limitations on volatility of the amino alcohol used. During manufacture of the adhesive and during its melting and application, the adhesive composition is heated, and indeed whilst in a melt pot prior to application may be maintained at a comparatively high temperature. It is important that the amino alcohol be substantially non-volatile under these processing conditions. We believe that melt applied adhesive compositions will not normally have to withstand a temperature of more than about 120° C. for an eight hour period, and therefore we prefer to use an amino alcohol having a boiling point at room pressure somewhat in excess of this value and preferably in excess of 150° C. Additionally, the amino alcohol used is one which does not affect flow and application characteristics of the adhesive composition either by way of bubbles of vapor or specks of solid derived from the amino alcohol. We also believe that additional chemical reaction of the reaction product of the amino alcohol and potentially soluble polymer may lead to cross-linking of the reaction product through the amino alcohol molecule, and further that such reaction is favored by warm moist conditions; such warm moist conditions could occur for example if water is present in the melt pot from which the adhesive composition is applied. Cross-linking of the polymer leads to greater insolubility and is undesirable in the present invention. Accordingly, it is also important that the amino alcohol used is one which does not readily react at higher temperatures with the potentially soluble polymer. This temperature dependent cross-linking reaction appears to be favored where the amino alcohol used has a higher hydroxyl content.

Another important criterion is the solubility in cold water of the reaction product of the amino alcohol and potentially soluble polymer. This solubility also appears to be enhanced where amino alcohols having higher hydroxyl content are used. For example, with triethanolamine, solubility of the reaction product and cross-linking of this reaction product are both more favored than with diethanolamine.

The color of the adhesive bond line formed is sometimes important, and in such cases it is important to use an amine which does not adversely affect the color of the adhesive. We prefer to employ as the amino alcohol a secondary or a tertiary amino compound in the molecule of which there are not less than two lower aliphatic residues attached to the nitrogen atom, each including a hydroxyl group. Examples of these materials are diisopropanolamine (boiling point about 250° C. at room pressure), diethanolamine (boiling point 270° C. at room pressure), triethanolamine (boiling point 206° C. at 15 Torr), or N-methyl diethanolamine (boiling point about 246°-249° C. at room pressure), and mixtures thereof. From amino alcohols having two hydroxyl groups per molecule, we prefer to use diisopropanolamine and diethanolamine in our preferred compositions. We prefer to use the amino alcohol in quantities of about 2 to 10, more preferably about 3 to 6, parts by weight per 100 parts by weight of the composition.

The polymeric binder material which is insoluble in water has carboxylic acid groups present in the polymer chain or otherwise associated with the material. A preferred material is a vinyl acetate-crotonic acid copolymer having from about 2% to about 10% crotonic acid, a most preferred material having of the order of 2% by weight carboxylic acid groups. Pentaerythritol ester of colophonium having an acid number in the range of about 196 to about 212 may also be used, in which case the solubilizing effect required is somewhat less because such polymers tend to be more soluble in cold water. These materials preferably have viscosity and melting point values in the ranges 3,000 cps. at 175° C. and a softening point of 105° C. (Ring and Ball), respectively, Other insoluble polymeric binders, e.g. thermoplastic copolymers, may also be included to enhance strength and cohesion of the adhesive, for example where the composition is intended as a laminating adhesive in for example making reinforcing paper tapes for packaging. Examples of such materials include ethylenevinyl acetate and ethylene-ethyl acrylate copolymers having a melting point in the range of about 65° C. to about 67° C., a melt index in the range of 5-7 g/10 minutes and viscosity values of from about 2,700–10,000 cps. at 150° C.

Solubility of compositions is enhanced by presence of significant quantities of plasticizing or flexibilizing materials which are themselves soluble in cold water. Examples of such materials include cellulose ethers, e.g. hydroxypropyl cellulose, and polyethylene ether glycols. In an adhesive composition according to the invention, the water soluble plasticizer preferably includes a large proportion of a polyethylene ether glycol having a molecular weight from 10,000 to 20,000 because these materials tend to have a flexibilizing effect on bonds formed with the composition. Polyethylene ether glycols having a molecular weight from 200 to 1000 may also be included for their more conventional plasticizing effect. Polyethylene ether glycols of molecular weights 1,000 to 10,000 may also be used but are not preferred. The water soluble plasticizer may also include a glycol for example triethylene glycol, venetian turpentine or other commonly available water soluble plasticizing ingredients.

In a preferred group of adhesive compositions intended to have resistance to high humidity and good flexibility of bonds, we have found it advantageous to include a substantial proportion of the vinyl acetate-crotonic acid copolymer in the composition. In a composition intended for bonding non-woven disposables, e.g. sanitary napkins and diapers, we prefer to use 2 to 10 parts by weight amino alcohol, a mixture of 0 to 20 parts by weight hydroxypropyl cellulose of 10 to 10,000 cps. (2 percent-by-weight solution in water) and 30 to 55 parts by weight vinyl acetate-crotonic acid copolymer, and as plasticizer a mixture of 5 to 55 parts by weight polyethylene ether glycol having a molecular weight of 10,000 to 20,000 and 5 to 10 parts by weight triethylene glycol. These compositions exhibit excellent flexibility and are capable of application as extremely thin beads deposited from the melt at high speed.

In a preferred group of adhesive compositions intended for making reinforced paper tapes for packaging, we prefer to use 2 to 10 parts by weight of the amino alcohol per hundred parts by weight of the composition, 10 to 65 parts by weight pentaerythritol ester of colophonium (more preferably 40 to 50 parts by weight) per 100 parts by weight of the composition, together with an ethylene-vinyl acetate copolymer (containing 28 to 40 percent-by-weight vinyl acetate and having a melt index of 20 to 300) or an ethylene-ethyl acrylate copolymer (containing 18 percent-by-weight ethyl acrylate and a melt index of 5 to 20); preferably these copolymers are used in admixture in a ratio by weight of from 10:90 to 90:10 more preferably in a ratio of 1:1 to provide from 10 to 30 parts by weight of the composition. In these compositions we prefer to use a plasticizer mixture of 10 to 30 parts by weight polyethylene ether glycol having a molecular weight of 10,000 to 20,000 and 10 to 20 parts by weight dibutyl phthalate or butyl benzyl phthalate per 100 parts by weight of the composition. These compositions exhibit high adhesion and cohesion, a low viscosity of the order of less than 6,000 cps. at 175° C. (measured on a Rotovisco), solubility in cold water (below 20° C.) under repulping conditions, low weight loss when held at 175° C. over two hours, and a comparatively short open time.

In a preferred group of adhesive compositions intended for bookbinding, we prefer to use 2 to 10 parts by weight amino alcohol, 10 to 20 parts by weight colophonium ester of pentaerythritol and 20 to 50 (preferably about 40) parts by weight of vinyl acetate-crotonic acid copolymer, and a plasticizing mixture of 10 to 30 parts by weight polyethylene ether glycol of 10,000 to 20,000 molecular weight and 5 to 15 parts by weight of triethylene glycol. Dibutyl phthalate or butyl benzyl phthalate may also be included in the plasticizer. These compositions exhibit good adhesion and cohesion, short open time, good flexibility, low viscosity at 150° C. (up to 7,000 cps. measured on a Rotovisco) and good heat resistance as well as sufficient water solubility for repulping.

Other ingredients may be included in the adhesive composition, for example fillers (e.g. calcium carbonate, borax) surfactants (e.g. ethylene oxide adducts) and extenders (e.g. paraffin wax having a melting point from about 50° C. to about 60° C.), and tackifiers (e.g. hydrocarbon resins). Care must be taken to select the ingredients so as not to adversely disturb properties required of the adhesive in its intended use, especially ability of the composition to be rendered at least substantially non-adhesive by pulping or exposure to quantities of water. For example, borax may be used as a filler, but although this may contribute to water solubility of the composition, its presence may lead to poorer heat resistance of the adhesive composition in the application step.

We prefer to select the type and quantity of ingredients used in an adhesive composition to give a softening point (Ball and Ring) of 60° C. to 110° C. so that the adhesive may be conveniently transported as a solid, e.g. in granule or rod form, and applied as a hot melt at a temperature in the range of 80° C. to 180° C. We prefer to arrange that in adhesive compositions intended to be used with paper which may be reclaimed by pulping, i.e. at water temperatures from about 40° C. to about 10° C. and pH between about 6 and about 9, during a normal paper repulping procedure, at least about 60%, more preferably 70 to 80 percent-by-weight of the adhesive is extracted in the water, and that any remaining solids are finely dispersed or otherwise such as may be extracted harmlessly with the paper pulp and remain therein without adversely affecting the resulting paper, and without interfering with the repulping equipment.

The amounts of the various materials used in a composition according to the invention are selected not only in accordance with the application, adhesive, and solubility properties required of the composition, but also in accordance with the amount and type of other materials included in the composition. For example, we have observed that as the content of particulate filler is increased so also is the ease with which soluble components of the composition can be dissolved or dispersed in cold water. Conversely, amounts of filler in excess of 20 percent-by-weight of the composition adversely affect application and adhesive properties of the composition. Inclusion of larger quantities of filler also enables use of greater quantities of the plasticizers. However, polyethylene ether glycols tend to be somewhat incompatible with larger amounts of colophonium esters, and we prefer to use no more than about 10 to 30 percent-by-weight polyethylene ether glycol having a molecular weight of 10,000 to 20,000 when significant quantities of colophonium esters are used in the adhesive compositions. In those cases where no colophonium ester is used, and a vinyl acetate-crotonic acid copolymer provides the reactive polymeric binder, we may use up to 55 percent-by-weight of polyethylene ether glycol having a molecular weight 10,000 to 20,000.

In order that the above and others of the various aspects of the invention may become more clear, there are hereinafter described examples of adhesive compositions and examples of their method of use each of which compositions is illustrative of the present invention. It will be understood that these illustrative compositions have been selected for description to illustrate the invention by way of example only and not by way of limitation thereof.

The illustrative compositions were made by mixing materials according to the formulations given in the Table:

TABLE

| Component | Illustrative Composition | | | | | |
|---|---|---|---|---|---|---|
|  | First | Second | Third | Fourth | Fifth | Sixth |
| Colophonium ester of pentaerythritol | 42 | 43 |  |  | 15 | 16 |
| Vinyl acetate-crotonic acid copolymer |  |  | 40 | 42 | 41 | 41 |
| Hydroxy propyl cellulose |  |  |  | 5 |  |  |
| Polyethylene ether glycol 20,000 molecular weight | 16 | 17 | 40 | 42 | 25 | 25 |
| Ethylene-vinyl acetate copolymer | 12 | 12.5 |  |  |  |  |
| Ethylene-ethyl acrylate copolymer | 12 | 12.5 |  |  |  |  |
| Diisopropanolamine |  |  |  | 5 |  |  |
| Triethanolamine | 6 | 5 | 5 |  | 4 | 3 |
| Venetian turpentine |  | 10 |  |  |  |  |
| Dibutyl phthalate | 11.5 |  |  |  |  |  |
| Calcium carbonate |  |  | 10 |  | 10 | 10 |
| Triethylene Glycol |  |  | 5 | 6 | 5 | 5 |
| Antioxidant | 0.50 | 0.50 | 0.50 | 0.50 | 0.50 | 0.50 |

The ethylene-vinyl acetate copolymer used was "Elvax 250" supplied by DuPont which is believed to comprise 27% to 29% vinyl acetate, and to have a melt index of 12 to 18g/10 minutes. The ethyleneethyl acrylate copolymer used was "Copolymer DPDB 6169" supplied by Union Carbide, which is believed to comprise 18% ethyl acrylate and have a melt index of 5 to 7g/10 minutes. The colophonium ester of pentaerythritol used in the first illustrative composition was "Resin B106" supplied by Hercules. The colophonium ester of pentaerythritol used in the second illustrative composition was "Pentalyn 255" supplied by Hercules. The hydroxypropyl cellulose used was "Klecel" having a viscosity of 10 to 10,000 centipoises as a 2% aqueous solution supplied by Hercules. The vinyl acetate-crotonic acid copolymer used as "Mowilith CE5" supplied by Hoechst and believed to contain from 95 to 99 percent-by-weight vinyl acetate.

The first illustrative composition had the following physical characteristics:
Softening Point (Ball & Ring) - 104° C.
Melt viscosity at 175° C. and 165 rpm - 3320 cps. (Roto-visco)
Melt viscosity at 175° C. and 330 rpm - 3100 cps. (Roto-visco)

The second illustrative composition had the following physical properties:
Softening Point (Ball & Ring) - 107° C.
Melt viscosity at 175° C. and 346 rpm - 4560 cps. (Roto-visco)

The first and second illustrative compositions were formed into granules and stored for application as a hot melt.

Sample bonds were made using the first and second illustrative compositions by laminating kraft paper layers with a loose web of nylon or polyester in the bond line. The compositions were found to have good thermal resistance at the application stage (the composition showing a weight loss of less than 4% after holding it at a temperature of 175° C. for two hours) and comparatively low viscosity at an application temperature of 175° C. (i.e. between 3,000 and 6,000 centipoises by Haake Rotovisco viscosimeter). These adhesives had a relatively short open time and the sample bonds exhibited high adhesive and cohesive strength. The action of water on bonds formed with the adhesive was observed in the following way: 0.06g of the adhesive were melted and applied to 0.24g of regular white paper. After the adhesive had cooled, the assembly was stored for one hour at 20° C. The assembly was then mixed with 30ml distilled water in a blender and chopped to a slurry during 2 to 5 minutes. This slurry was filtered through a glass filter by vacuum, and the residue from the filter dried between two filter papers and pressed. The resulting "cake" was visually compared with a control containing no adhesive; no adhesive effect or residue, e.g. in the form of fish eyes, was observed.

The first and second illustrative compositions were found particularly suitable for production of adhesive paper tapes by a process in which the adhesive is melted in a trough of a reverse roller coater, applied to paper, and then a loose reinforcing web of nylon or polyester applied into the adhesive layer.

The third and fourth illustrative compositions were found particularly suitable for use in bonding paper to paper, and paper to non-woven materials for non-woven disposables for example napkins and diapers. The composition exhibited good thermal resistance (less than 4% weight loss when held at 175° C. for 2 hours) under application conditions using an extrusion gun fed from a bulk applicator, and an ability to draw thin beads at high application speeds up to 75 meters/minute relative speed between the workpiece and the applicator nozzle. The bonds had excellent flexibility, and good adhesion and cohesion. The compositions had resistance to high humidity and yet good dispersibility on immersion in cold water as shown by the following test. Two layers of non-woven cellulosic material were heat bonded using a 100 × 1 × 0.2mm strip of the adhesive cut from a 0.2mm film. After one hour storage at b 20° C. the bond was immersed in cold water at 20° C. and moved up and down at a rate of about 30 times per minute. The time taken for complete separation of the two non-woven layers was 60 to 90 seconds although times in the range 60 to 350 seconds are acceptable.

The fifth and sixth illustrative compositions were found particularly suitable for bookbinding using a machine having roller applicators for applying adhesive to the spines of books at about 175° C., and an adhesive reservoir maintained 20° C. below application temperature. These compositions were found to have good adhesion and cohesion, a sufficiently short open time to allow production of more than 8,000 books per hour, and excellent thermal resistance under application conditions (less than 4% weight loss over 2 hours at 175° C.). These compositions also satisfied the water solubility test used with the first and second illustrative compositions.

Having thus described our invention, what we claim as new and desire to secure by Letters Patent of the United States is:

1. A hot melt adhesive composition having a softening point (Ball and Ring) of from about 60° to about 110° C. for application in molten state to form strong, flexible adhesive bonds to cellulosic material and also capable of being dissolved or dispersed in cold water when disposed as an adhesive layer between cellulosic sheets, said adhesive comprising a polymeric binder material which is insoluble in cold water and which has free carboxylic groups, said binder being selected from the group consisting of a copolymer of vinyl acetate with from about 2% to about 10% of crotonic acid and a colophonium ester of pentaerythritol having an acid number of from about 196 to about 212, characterized in that the composition contains from about 2% to about 10% of an aliphatic amino alcohol reactive in the presence of water with the carboxylic groups of the polymeric material to promote solubility of the polymeric material in cold water.

2. A hot melt adhesive composition as defined in claim 1 comprising per hundred parts by weight of the composition, from about 20 to about 55 parts by weight of a copolymer of vinyl acetate with from about 2% to about 10% of crotonic acid and further characterized in that said amino alcohol is a secondary or tertiary amino compound having not less than two aliphatic hydroxyl bearing residues valence bonded to its nitrogen atom.

3. A hot melt adhesive composition as defined in claim 1 comprising per hundred parts by weight of the composition, from about 10 to about 65 parts by weight colophonium ester of pentaerythritol having an acid number of from about 196 to about 212, a melt viscosity in the range of 3000 cps. at 175° C. and a softening point (Ring and Ball) of about 105° C. and further characterized in that said amino alcohol is a secondary or tertiary amino compound having not less than two aliphatic hydroxyl bearing residues valence bonded to its nitrogen bond.

4. A hot melt adhesive composition as defined in claim 2 further characterized in that it comprises per hundred parts by weight of the composition, from about 5 to about 55 parts by weight polyethylene ether glycol having a molecular weight of 10,000 to 20,000 as water soluble plasticizer.

5. A hot melt adhesive composition as defined in claim 3 further characterized in that it comprises per hundred parts by weight of the composition, from about 5 to about 55 parts by weight polyethylene ether glycol having a molecular weight of 10,000 to 20,000 as water soluble plasticizer.

6. A hot melt adhesive composition as defined in claim 4 in which said amino alcohol is selected from the group consisting of diisopropanolamine, diethanolamine, triethanolamine, N-methyl diethanolamine and mixtures of these amino alcohols.

7. A hot melt adhesive composition as defined in claim 5 in which said amino alcohol is selected from the group consisting of diisopropanolamine, diethanolamine, triethanolamine, N-methyl diethanolamine and mixtures of these amino alcohols.

8. A hot melt adhesive as defined in claim 6 further characterized in that it comprises per hundred parts by weight of the composition up to 40 parts by weight of water insoluble materials which are not reactive with the amino alcohol.

9. A hot melt adhesive as defined in claim 7 further characterized in that it comprises per hundred parts by weight of the composition up to 40 parts by weight of water insoluble materials which are not reactive with the amino alcohol.

10. A hot melt adhesive as defined in claim 1 comprising per 100 parts of the composition from about 30 to about 55 parts by weight of a copolymer of vinyl acetate with from about 2% to about 10% of crotonic acid, from 0 to about 55 parts by weight polyethylene ether glycol having a molecular weight from 10,000 to 20,000, and from about 5 to about 10 parts by weight triethylene glycol.

11. A hot melt adhesive as defined in claim 1 comprising per 100 parts by weight of the composition 20 to about 55 parts by weight of a copolymer of vinyl acetate with from about 2% to about 10% of crotonic acid, from about 10 to about 20 parts by weight colophonium ester of pentaerythritol having an acid number of from about 196 to about 212 from about 10 to about 30 parts by weight polyethylene ether glycol having a molecular weight from 10,000 to 20,000 and from about 5 to about 15 parts by weight triethylene glycol.

12. A hot melt adhesive as defined in claim 3 comprising per 100 parts by weight of the composition, from about 10 to about 65 parts by weight colophonium ester of pentaerythritol having an acid number of from about 196 to 212, from about 10 to about 30 parts by weight of a mixture of ethylene vinyl acetate copolymer and ethylene ethyl acrylate copolymer having viscosities of from about 2700 to about 10,000 cps. at 150° C., from about 10 to about 30 parts by weight polyethylene ether glycol having a molecular weight in the range 10,000 to 20,000 and from about 10 to about 20 parts by weight of a phthalate ester plasticizer.

* * * * *